US005196860A

United States Patent [19]

Pickell et al.

[11] Patent Number: 5,196,860

[45] Date of Patent: Mar. 23, 1993

[54] INK JET DROPLET FREQUENCY DRIVE CONTROL SYSTEM

[75] Inventors: James R. Pickell, Bartlett; Robert I. Keur, Niles; James E. Clark, Naperville, all of Ill.

[73] Assignee: Videojet Systems International, Inc., Wooddale, Ill.

[21] Appl. No.: 523,847

[22] Filed: May 16, 1990

Related U.S. Application Data

[63] Continuation of Ser. No. 332,009, Mar. 31, 1989, abandoned.

[51] Int. Cl.[5] .......... G01D 18/00

[52] U.S. Cl. .......... 346/75

[58] Field of Search .......... 346/1.1, 75

[56] References Cited

U.S. PATENT DOCUMENTS

| | | | |
|---|---|---|---|
| 3,866,237 | 2/1975 | Meier | 346/75 |
| 4,068,241 | 1/1978 | Yamada | 346/75 |
| 4,367,476 | 1/1983 | Sagae | 346/1.1 |
| 4,417,256 | 11/1983 | Fillmore et al. | 346/75 |
| 4,631,549 | 12/1986 | Braun et al. | 346/1.1 |
| 4,638,325 | 1/1987 | Schneider et al. | 346/1.1 |
| 4,688,047 | 8/1987 | Braun et al. | 346/1.1 |
| 4,727,379 | 2/1988 | Sourlis et al. | 346/75 |
| 4,878,064 | 10/1989 | Katerberg et al. | 346/75 |

FOREIGN PATENT DOCUMENTS

| | | |
|---|---|---|
| 0193916 | 9/1986 | European Pat. Off. . |
| 287373B1 | 4/1988 | European Pat. Off. . |
| 0287373 | 10/1988 | European Pat. Off. . |

*Primary Examiner*—Benjamin R. Fuller
*Assistant Examiner*—Gerald E. Preston
*Attorney, Agent, or Firm*—Rockey, Rifkin and Ryther

[57] ABSTRACT

A drive control system automatically maintains nozzle drive voltage within a proper range. The control system monitors the state of the "intermediate satellites" positioned between ink drops used for printing. When these satellites are neither forwared nor backward merging, a first cardinal point designated C(L) is identified. A second cardinal point, C(H), is determined when the drop breakoff point stops decreasing, relative to said nozzle, with increasing nozzle drive voltage. From the two cardinal values, a desired operating range for a particular ink can be computed and the control system automatically set. The computed value is essentially independent of temperature.

15 Claims, 4 Drawing Sheets

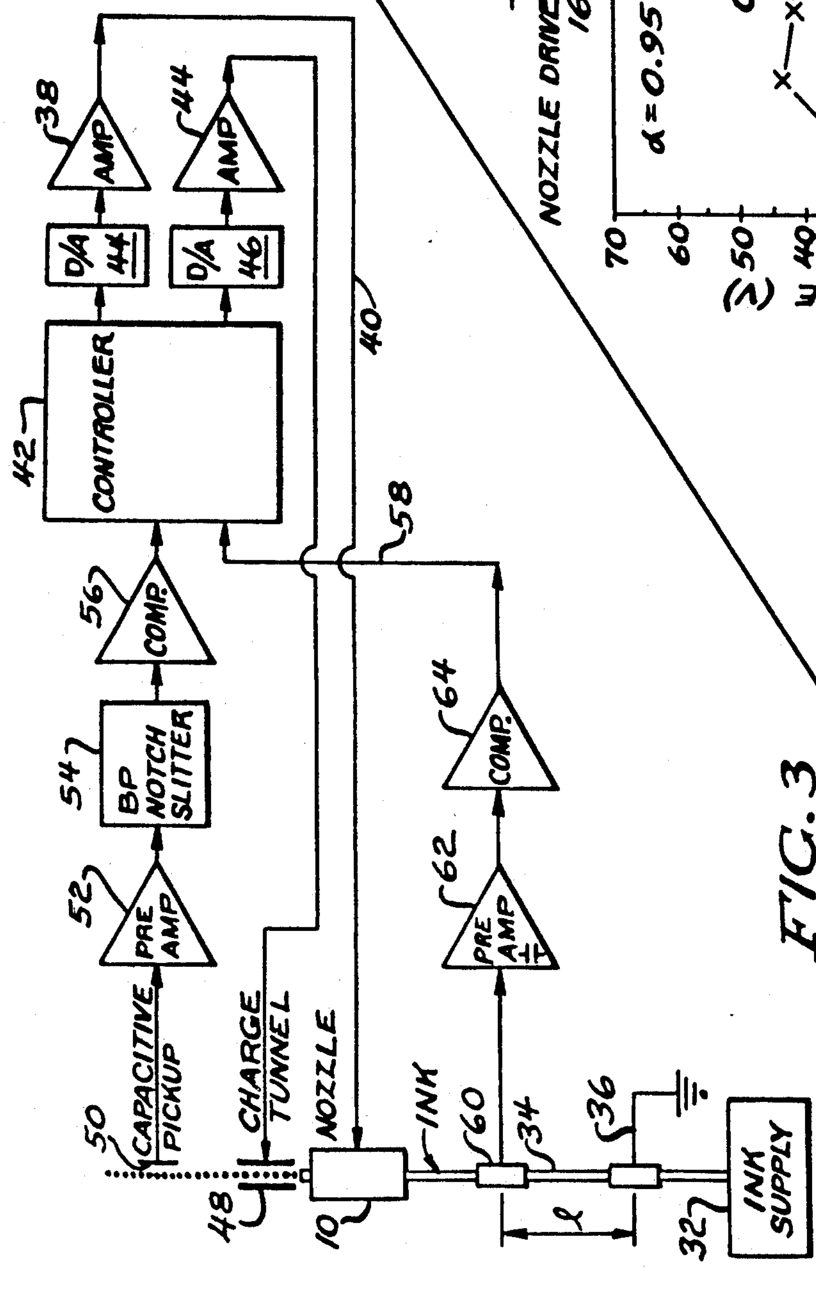
FIG. 3
FIG. 4
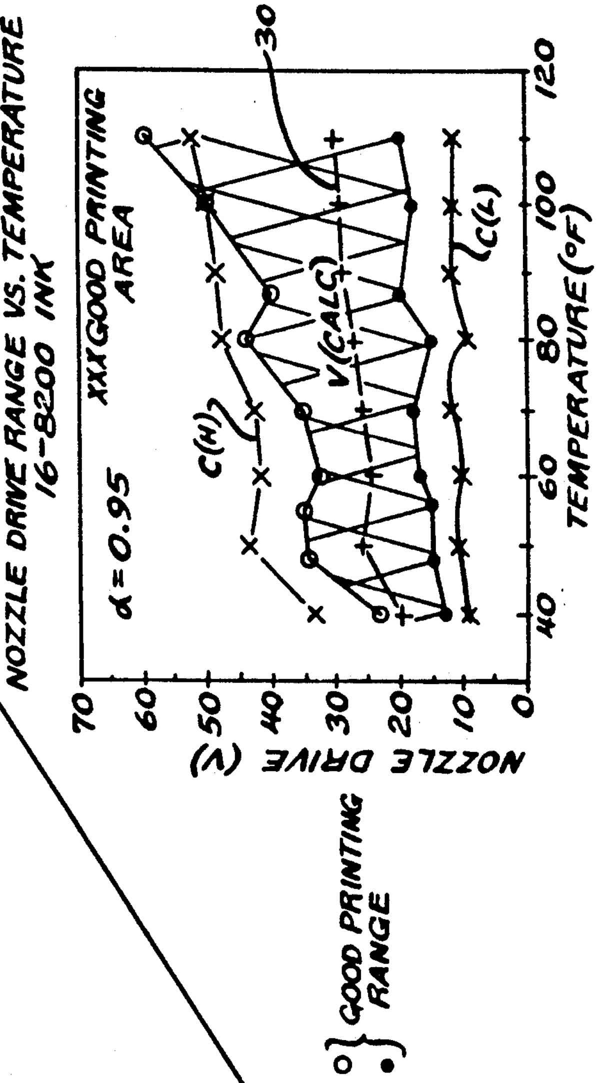

INTERMEDIATE SATELLITE DETECTORS

INK JET DROPLET FREQUENCY DRIVE CONTROL SYSTEM

This application is a continuation of application Ser. No. 07/332,009, filed Mar. 31, 1989, now abandoned.

BACKGROUND OF THE INVENTION

This invention relates to ink jet printing systems and similar drop marking systems in which a supply of electrically conductive ink is provided to a nozzle. The ink is forced through a nozzle orifice while at the same time an exciting voltage is applied to the nozzle to cause the stream of ink to break into droplets which can be charged and deflected onto a substrate to be marked. Such ink jet technology is well known and, for example, see U.S. Pat. Nos. 4,727,379 and 4,555,712.

To ensure proper operating conditions for consistent printing quality, the exciting energy or voltage applied to the nozzle must be properly set during operation of the system. Presently, most ink jet printers require manual setting of the energy applied to the ink stream as it exits the nozzle. The appropriate value is either empirically determined by comparing what is seen to an existing diagram or by determining the drop separation point and comparing it with machine specifications. In either case, the resulting print quality varies.

Efforts to provide automatic control of the modulation voltage have concentrated on detecting separation point position, relative to a fixed location, such as the charge tunnel. See, for example, published European patent specification EPA 0287373. Another approach is disclosed in U.S. Pat. No. 4,638,325 which utilizes a small charging electrode and a downstream electrometer by which the drop separation point ca be determined by observing the current at the electrometer as the separation point approaches the small electrode. In the U.S. Pat. No. 4,638,325 the maximum current is produced when drop separation is closest to the small charging electrode.

The above method does not take into account the basic reason for maintaining consistent drop charging conditions. The drop separation point varies greatly with the surface tension and viscosity of the ink, therefore, simply holding the separation point constant still results in different satellite conditions and variable print quality. In short, maintaining the drop separation point constant is not a satisfactory solution to the problem.

What is desired is a system which can determine a range of proper printing nozzle drive voltages and then compute a satisfactory intermediate value within said range. Such a system should be temperature independent over a wide range of operating temperatures to result in a significantly better control system.

It is accordingly an object of the present invention to provide such a nozzle drive control system which improves upon known techniques.

It is a further object of the invention to provide a nozzle control system which can accurately monitor the condition of the satellite drops and the drop breakoff point and compute therefrom a satisfactory range of nozzle drive voltages for operating an ink jet printer.

A further advantage of this invention is that it allows automation of the nozzle voltage for best quality printing using a continuous ink jet printer regardless of ink type and temperature. This invention avoids problems with recombining satellites that occur when holding the drop separation point constant while ink type and temperature vary. These cause unwanted charge variations because a satellite which carries part of the charge of its parent charged drop will transfer that charge to the drop following when merging occurs. These and other objects of the invention will be apparent from the remaining portion of this specification.

BRIEF DESCRIPTION OF THE DRAWINGS

FIG. 3 is a circuit diagram illustrating the control circuit according to the present invention.

FIG. 4 is a graph useful in explaining the operation of the present invention.

DETAILED DESCRIPTION

Figure 1:
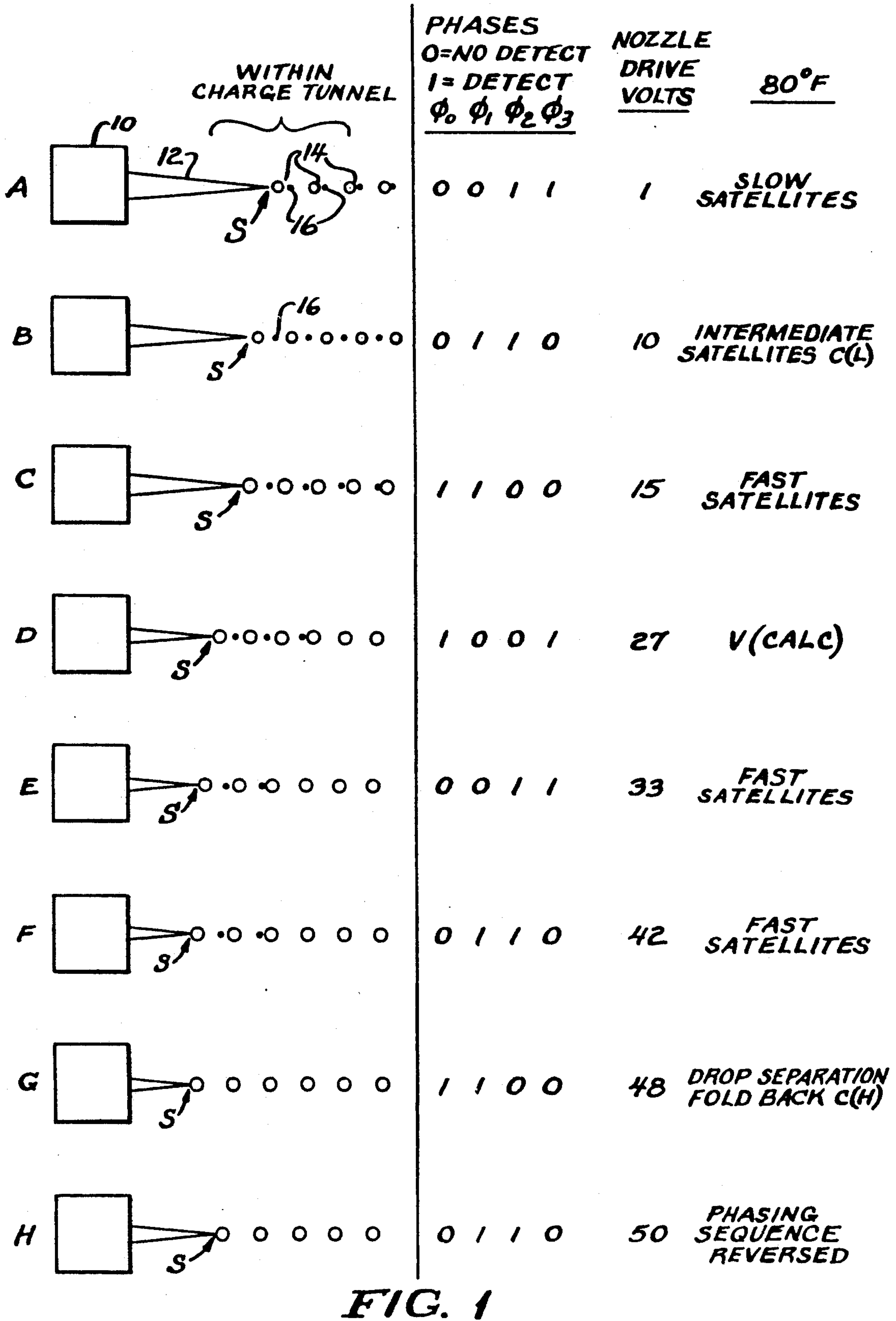
FIG. 1 the principles of ink jet drop formation useful in under the present invention.

Referring to FIG. 1, there are a series of nozzles shown. The nozzle 10 emits therefrom a stream of ink 12. A nozzle drive voltage is applied which voltage causes the stream to break up into a series of discrete drops 14. Smaller drops, known in this art as satellites, form between the drops 14. The satellites 16 behave in a manner which is a function of the energy applied to the nozzle (measured in terms of the nozzle voltage).

Referring to FIG. 1, when the applied acoustic power to the ink stream is low, the natural behavior of the satellites is to form independently of the drops and then fall back and merge with the drops which follow. This is referred to as rearward merging satellites or slow satellites and is illustrated in FIG. 1A. The fall back and merging occurs in approximately ten drop periods depending upon the physical parameters of the ink (viscosity, surface tension, specific gravity, etc.).

As the drive to the nozzle is increased, a point, designated herein as C(L), will occur. This term refers to a lower cardinal point. Cardinal is a term borrowed from optics terminology where it denotes an important point of a lens system, i.e., a focal point, a nodal point, or a principal point. For purposes of the present specification, C(L) is an important point because it represents the point at which the satellites separate from the leading and the following drops at the same time (see FIG. 1D). Surface tension forces pull these satellites forward and backward with equal force. The result is that the satellites stay at a mid or intermediate point between the drops as they travel through space. It is this condition, referred to as C(L), that can be detected at a downstream point by detecting the satellites and the drops. At the point C(L) there will be a doubling of the normal drop frequency which can be detected. In all other cases, the satellites will have merged with either the leading or the trailing drops. Appropriate detectors are illustrated and described in connection with FIG. 5 of this disclosure.

Virtually all nozzles used for ink jet printing systems exhibit such intermediate satellites which are neither forward nor rearward merging. The point C(L) will be detected by frequency doubling as the power to the nozzle drive is increased from a low level to a level just adequate to form intermediate satellites.

Figure 5:
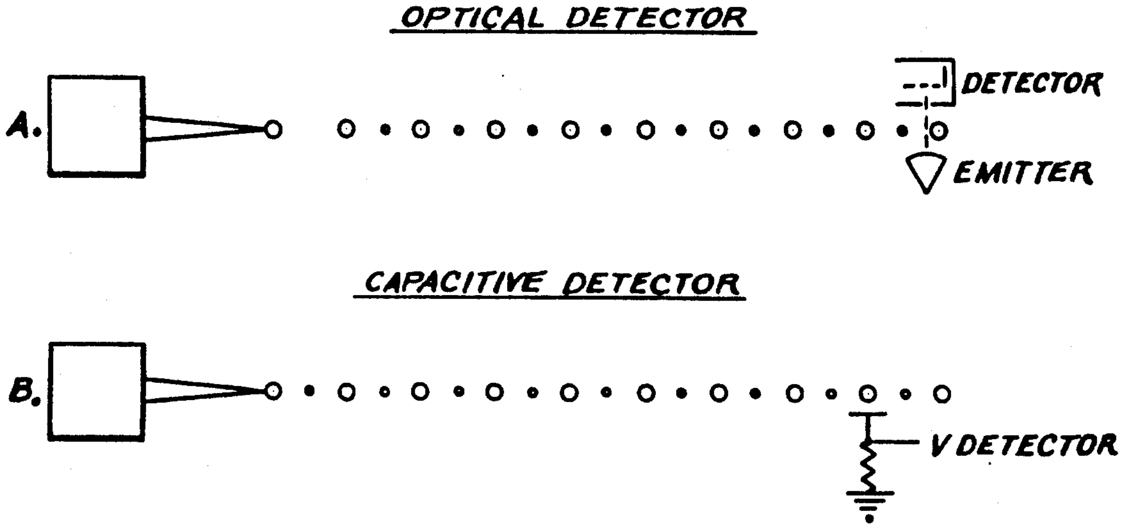
FIG. 5 illustrates the manner in which intermediate satellites m detected.

In one embodiment of the FIG. 5 detector, an appropriate test signal is placed on a charging electrode so that both the drops and the intermediate satellites will be charged. The sense drop frequency will double when intermediate satellites are present and pass the sensor. Alternatively, an optical detector may be employed which does not require charging of the drops and satellites but will detect a doubling in the number of drops passing the detector.

In either case, the detector is positioned a sufficient distance downstream from the nozzle orifice to permit the satellites to merge.

In addition to a lower cardinal point, C(L), most ink jet nozzles also exhibit what can be designated as an upper cardinal point, C(H). This point can be observed by slowly increasing the power to the nozzle and observing the point of drop separation. As the power to the nozzle is increased from a low level (FIG. 1A), the drop separation point, designated S, moves closer to the nozzle until it reaches (FIG. 1G) its minimum distance from the nozzle. This is designated the upper cardinal power point C(H). Thereafter, the breakoff point moves away from the nozzle (FIG. 1H) This fold back or reversal can be sensed by appropriate circuitry and software. A description of the circuitry and methodology for detecting the upper cardinal point C(H) is provided in connection with a description of FIG. 3.

First, however, with reference to FIG. 4, there is shown a graph which demonstrates the characteristics of a typical ink used in an ink jet printing system. This ink, manufactured by the assignee of the present invention, and designated 16-8200, was utilized with a nozzle of the type described in U.S. Pat. No. 4,727,329, which patent is hereby incorporated by reference. The cross hatched area on the graph represent nozzle drive voltages that produce good quality printing over a temperature range of approximately 40 degrees F. to 110 degrees F. The lower and upper cardinal power points, C(L) and C(H), are also plotted for the same nozzle and ink composition. From this information, it is possible to calculate a voltage value, V(calc), from the following equation:

$$V(calc) = alpha\ [C(L) + C(H)]/2 \qquad \text{EQ 1}$$

where alpha is a function of the ink described hereafter.

Values of V(calc) calculated from the foregoing equation are plotted in FIG. 4. These values of V(calc) all lie within the cross hatched area of the graph and represent nozzle drive voltages that produce quality printing.

Referring to FIGS. 1 and 3, circuitry suitable for practicing the invention will be described. The nozzle 10 is connected to an ink supply 32 via an ink conduit 34. The ink stream is grounded intermediate the ink supply and nozzle 36. The nozzle has an acoustic energy applied to it, as for example, by means of a piezo-electric device as disclosed in the aforementioned U.S. Pat. No. 4,727,379. The drive voltage for the piezo-electric device is provided from a nozzle drive amplifier 38 via line 40. In turn, the amplifier is controlled by a processor 42, such as a microcomputer, via a digital to analog converter (D/A) 44. The controller 42 also operates charge amplifier 44 via D/A 46 to control the voltage applied to the charge tunnel 48. As is well known in this art, the charge tunnel 48 is disposed downstream of the nozzle 10 in the region where the drops are intended to form as the stream of ink breaks up into drops and satellites. In this manner selected drops can be charged for deflection onto a substrate or, if left uncharged, returned by way of a gutter to the ink supply 32.

According to the present invention, the controller 42 receives input signals from a capacitive pickup 50 downstream of the charge tunnel. The signal from the pickup 50 is provided to a preamplifier 52 and to a band pass filter 54 (a notch filter designed to pass a frequency equal to twice the normal drop frequency of the ink jet system). Thus, the capacitive pickup 50 detects the point C(L) in which the drop frequency has doubled due to the presence of intermediate satellites (FIG. 1B). That signal, analogue in nature, is passed by the filter 54 to a comparator 56 which provides a digital output when the input exceeds a threshold. This signals the controller that C(L) has been detected. The controller thus stores the corresponding nozzle drive voltage valve.

The second input of interest to controller 42 provides a signal indicating the occurrence of C(H), the fold back point illustrated in FIG. 1G. This signal is produced on line 58 from a pickup 60 in electrical communication with the electrically conductive ink stream. The output of pickup 60 is provided to an integrating preamplifier 62 which, in turn, is provided to a comparator 64. As will be described, if the charge on the capacitor associated with preamplifier 62 exceeds a threshold set for comparator 64, a digital output is provided on line 58 to the controller.

Figure 6:
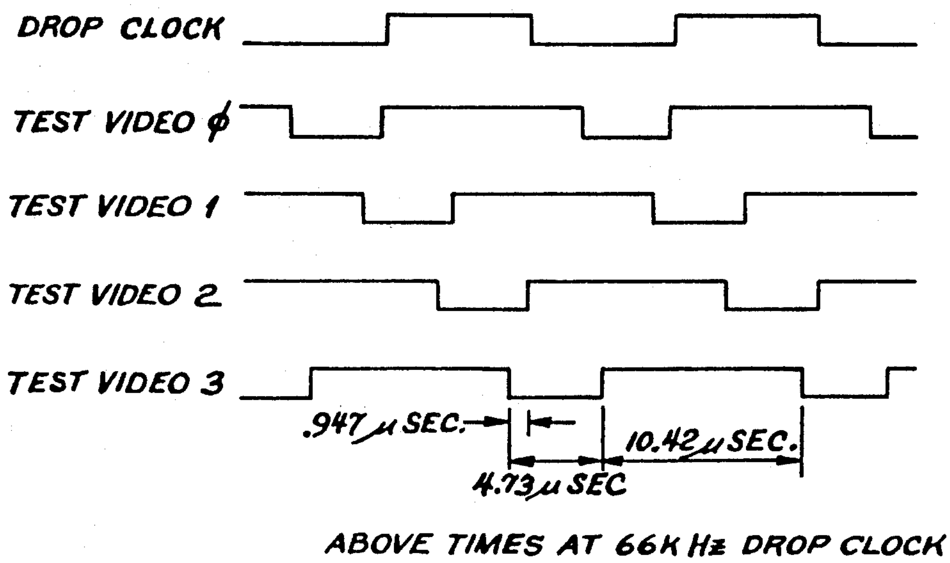
FIG. 6 is a timing diagram useful in explaining the test pattern used for detecting the upper cardinal point.

To understand the function of the comparator 64, it is necessary to refer to FIGS. 1, 3 and 6. To determine C(H), a test signals are placed on the charge tunnel 48 for a period equal to 30 drop times. For example, the signal denoted Test Video 0 in FIG. 6. The wave form illustrated in FIG. 6 is referenced to the drop clock wave form which may be, for example, 66 kilohertz. During the time that the test video 0 signal is high, the charge tunnel 48 attempts to apply a charge to each ink drop formed as the droplets break off from the ink stream. During this period the pickup 60 will detect whether or not the drops are successfully charged. For each drop which is charged a incremental charge is stored on the capacitor associated with the preamplifier 62. If most of the drops are successfully charged by the test video signal, the voltage from the preamplifier will exceed the threshold set on the comparator 64 and signal the controller. This sequence is then repeated for test video signals 1, 2, and 3, all of which are illustrated in FIG. 6. Each test pattern is a quarter lambda out of phase from the preceding test pattern (where lambda is the droplet spacing). As a result, it is possible to accurately determine the location (in quarter lambdas, for example) of the droplet breakoff point relative to the positions of the two cardinal points.

The result of this operation is illustrated in FIG. 1 where there is shown for each of FIGS. 1A–H a four bit binary code representing the results of applying the test video signals 0 through 3. Thus, for example, with respect to FIG. 1B, test video 1 and test video 2 are digital ones, while test video 0 and test video 3 are zero indicating that the latter two test videos did not result in charging of the droplets (This is due to the phase of the test video signals relative to the drop clock).

As the drive voltage to the nozzle increases, the pattern of the successfully charged drops changes as indicated in FIG. 1 in a predictable sequence based upon the phasing of the test video signals. At the cardinal point C(H), however, there is a first phase reversal (additional phase reversals may occur at higher drive voltages). That is, instead of the expected phase pattern 1001 for FIG. 1H, the pattern 0110 is observed, which pattern is exactly the same as FIG. 1F. Thus, the circuit accurately detects C(H) the first fold back point where drop breakoff within the charge tunnel 48 is at a minimum distance from the nozzle.

In practice, the comparator 64 is preferably sampled only once, at about 15 drop times after the start of each test video signal. The output from the comparator is a one or zero indicating that the drops were or were not successfully charged.

It will be recognized from the review of FIG. 6 that the four test video signals have a pulse width of approximately 66% of the drop time and that each test video signal is one-quarter drop time out of phase with every other test video signal. The phasing sequence ends after the output of the comparator is recorded for the four video test signals.

As can be seen from FIG. 1, the drop separation point occurs earlier (nearer to the nozzle) as nozzle voltage increases. This is recognized by the detector as indicated by the pattern of ones marching from right to left in Figures A through G (and wrapping around). This continues until the fold back point, C(H) where the sequencing reverses itself and the detector signals this voltage value to the controller.

While the FIG. 3 embodiment shows separate pickups for C(L) and C(H), it will be recognized by those skilled in the art that the capacitive pickup 50 can be used for both purposes. That is, the pickup 50 can detect the C(L) value and, by connecting preamp 60 and comparator 64 to the capacitive pickup, it can also detect C(H). Thus, it is not necessary to use a separate pickup 60 behind the nozzle since the capacitive pickup 50 downstream of the charge tunnel can, if desired, perform both functions.

It will be recognized by those skilled in the art that if a separate pickup 60 is utilized for detecting C(H) it is then possible to use an optical or an acoustical pickup in place of the capacitive pickup 50 to detect C(L). The advantage of using an optical or acoustical pickup is that the drops do not have to be charged t be detected.

Figure 2:
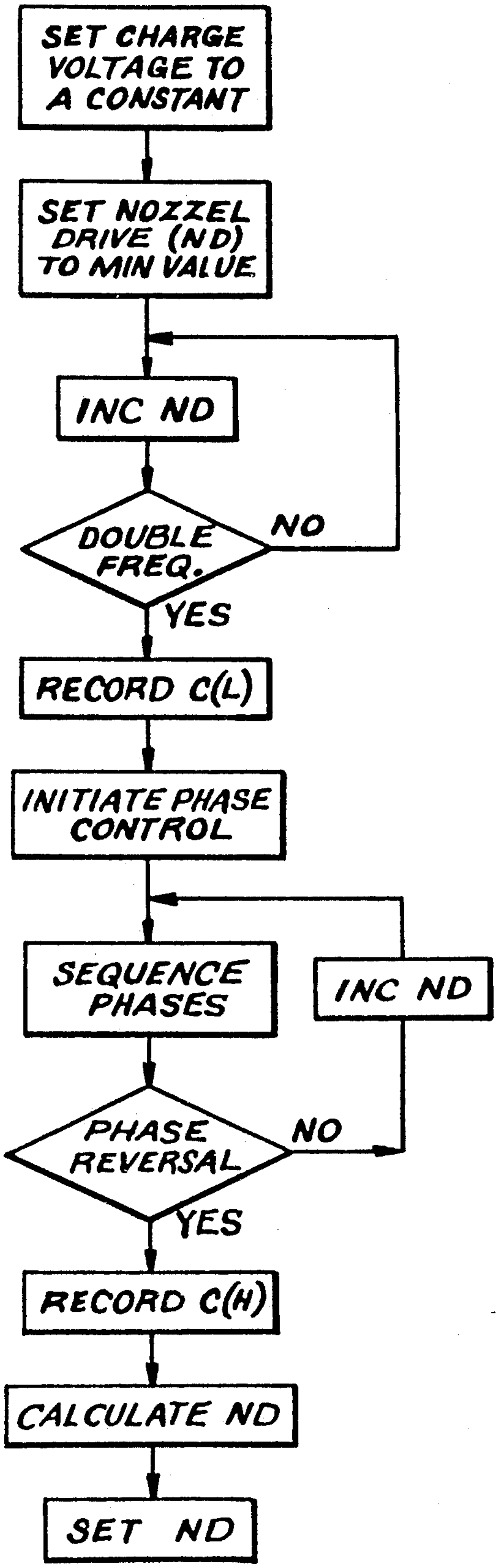
FIG. 2 a software flow diagram illustrating the manner in which the of the present invention operates.

When the controller has received the information necessary to determine C(L) and C(H), it employs equation one to calculate V(calc). FIG. 2 illustrates a software flow diagram suitable for performing the calculations according to the present invention. It is important to note that knowledge of the ink temperature is not necessary for a determination of a proper nozzle drive voltage.

Referring to FIG. 2, determination of the cardinal points will be described. The controller 42, in the case where a capacitive pickup is utilized, sets the charge tunnel voltage to a constant value. It then sets the nozzle drive voltage to a minimum value via line 40. Nozzle drive voltage is slowly increased and the capacitive pickup is checked to determine if frequency doubling has occurred. If not, voltage increases, in small increments, until frequency doubling is detected. As indicated previously, frequency doubling indicates the condition where intermediate satellites, which are not merging, are being formed. When frequency doubling is detected, the value of the nozzle drive voltage is recorded as C(L).

The controller then initiates the phase control portion of its routine to detect C(H). The test video signals shown in FIG. 6 are applied to the charge tunnel electrode. The sensor 60, or alternatively the capacitive pickup 50, is monitored to detect whether drops have been successfully charged for each of the four test signals. The software then checks to detect whether or not phase reversal has occurred. If not, the nozzle drive voltage is increased, in small increments, until phase reversal is detected. Upon detection, the nozzle drive voltage is recorded as C(H).

Upon obtaining values of C(H) and C(L), the value V(calc) is computed. This value V(calc), which is shown in FIG. 4 is in the middle of the desirable operating range of the system and is thereafter used as the nozzle drive voltage. In summary form, this operation may be stated as follows:

I.

A. Assuming an electrical charge detector, begin by applying a constant charge voltage to the charging electrode (charge tunnel).

B. Increase the applied nozzle drive voltage slowly from a low level, i.e., less than 9 volts, sine wave, peak-to-peak.

C. Monitor the downstream detector for a frequency twice that of the drop frequency, that is, search for intermediate satellites.

D. Once the doubled frequency is detected, record the voltage level as the lower cardinal power point C(L).

II.

A. Switch to the phasing system and apply sequential phasing voltages to the charging electrode.

B. Observe the sequential direction of "good" phase (in our example "1"s) as nozzle drive voltage is increased.

C. Record the nozzle voltage as C(H) when the direction or sequence of the good phase reverses.

D. Calculate the proper drive voltage from eq(1) for the ink and apply it the nozzle.

Referring again to equation one, it will be noted that the calculation of the value V(calc) requires a value alpha be specified which is ink dependent. This value alpha can be determined as follows. Since the good printing region lies sandwiched between the lower and upper cardinal power points (see FIG. 4) an acceptable solution would be to set alpha $=1$. This would locate V(calc) midway between C(L) and C(H), however, some added tolerance may be gained by choosing slightly smaller or slightly larger values. A smaller alpha would lower V(calc) and a larger alpha would raise V(calc). It is desirable to adjust alpha for each ink to optimize its printing range. This can easily be done by calculating V(calc) for a specific alpha and plotting the results on a graph representing the desirable range of a particular ink. In other words, if desired, alpha may be empirically optimized for each ink composition.

The desirable portion of the range shown in FIG. 4 can also be accessed by using only one of the cardinal power points. For example, the following equations can be used for calculating a nozzle drive voltage that will produce good printing from the lower or the higher cardinal points:

$$V(L)=C(L)+E_1 \quad \text{EQ 2}$$

$$V(H)=C(H)-E_2 \quad \text{EQ 3}$$

where:

$E_1=15$ volts $E_2=20$ volts $E_1$ and $E_2$ are voltages empirically determined from the good printing range of a particular ink. For example, in FIG. 4, C(L) is about 10 volts. V(calc) is about 25 volts. Therefore, if $E_1$ is selected as 15 volts, it will reliably approximate v(calc) when used in EQ 2. Both V(L) and V(H) will lie within the cross hatched area on the graph in FIG. 4.

While we have shown and described embodiments of the invention, it will be understood that this description and illustrations are offered merely by way of example, and that the invention is to be limited in scope only as to the appended claims.

What is claimed is:

1. A control circuit for setting a magnitude of an exciting voltage applied to a nozzle of an ink jet printer to break a stream of ink into droplets comprising:

(a) first means for detecting an exciting voltage value C(L) at which droplet frequency doubles as the magnitude of the exciting voltage is slowly increased from a minimum value;

(b) second means for detecting a value C(H) at which droplet formation first occurs closest to said nozzle, as said exciting energy is slowly increased from said value C(L);

(c) third means receiving as inputs the values C(L) and C(H) for calculating the exciting voltage magnitude to be utilized for printing therefrom.

2. The control circuit of claim 1 wherein said first detecting means includes a capacitive pickup downstream of said nozzle; said droplets being electrically charged whereby said pickup detects charged droplets.

3. The control circuit of claim 2 wherein said first detecting means further includes circuit means coupled to said pickup for providing an output signal to said calculating means when said droplet frequency doubles.

4. The control circuit of claim 1 wherein said first detecting means include an optical detector located downstream of said nozzle, said detector detecting the droplets passing said detector.

5. The control circuit of claim 4 wherein said first detecting means further includes circuit means coupled to said pickup for providing an output signal to said calculating means when said droplet frequency doubles.

6. The control circuit of claim 1 further including means for applying electrical test patterns to said droplets, said patterns varying in phase relative to a droplet timing whereby only some of the test patterns successfully charge said droplets, said second detecting means includes a pickup to detect which droplets have been charged, said calculating means including means for determining the C(H) value from the change in a sequence of charge patterns.

7. The control circuit of claim 6 when said means for applying said test patterns includes a charge amplifier and a charge tunnel positioned downstream of said nozzle in a region of droplet formation.

8. A circuit for determining an exciting voltage to be applied to a nozzle of an ink jet printer to break a stream of ink into droplets for printing comprising:

(a) means for slowly increasing the exciting voltage from a minimum value;

(b) means for detecting and recording a voltage value C(L) at which the droplet frequency doubles due to a formation of intermediate (non-merging) satellite droplets;

(c) means for detecting and recording a voltage value C(H) at which droplet formation first occurs closest to the nozzle;

(d) means for calculating the exciting voltage for printing according to the equation:

$$V(CALC) = alpha[C(L) + C(H)]/2$$

where alpha is a value related to the ink.

9. A control circuit for determining an exciting voltage to be applied to a nozzle of an ink jet printer to break a stream of ink into droplets for printing comprising:

(a) means for detecting and recording a voltage value C(L) at which droplet frequency doubles as a magnitude of the exciting voltage is slowly increased from a minimum value and for detecting a value C(H) at which droplet formation first occurs closest to said nozzle, as said exciting energy is slowly increased from said value C(L);

(b) means for receiving as inputs the values C(L) and C(H) for calculating the exciting voltage magnitude to be utilized for printing therefrom.

10. A control circuit for setting a magnitude of an exciting voltage applied to a nozzle of an ink jet printer to break a stream of ink into droplets comprising:

(a) first means for detecting exciting voltage value C(L) at which intermediate satellite droplets are produced by said nozzle as the exciting voltage is slowly increased from a minimum value;

(b) second means for detecting exciting voltage value C(H) which first produces a direction change in droplet breakoff point relative to said nozzle as the exciting voltage is slowly increased from C(L);

(c) third means utilizing the values C(L) and C(H) for computing a proper operating voltage to be utilized for printing.

11. The control circuit of claim 7 wherein first detecting means includes a capacitive pickup downstreanm of said nozzle; said droplets being electrically charged whereby said pickup detects the charged droplets.

12. The control circuit of claim 11 wherein said first detecting means further includes circuit means coupled to said pickup for providing an output signal to said calculating means when said droplet frequency doubles.

13. The control circuit of claim 7 further including means for applying electrical test patterns to said droplets, said patterns varying in phase relative to droplet timing whereby only some of the test patterns successfully charge said droplets, said second detecting means includes a pickup to detect which droplets have been charged, said calculating means including means for determining the C(H) value from a change in sequence of charge patterns.

14. The control circuit of claim 7 wherein said means for applying said test patterns includes a charge amplifier and a charge tunnel positioned downstream of said nozzle in a region of droplet formation.

15. A control circuit for determining an exciting voltage to be applied to a nozzle of an ink jet printer to break a stream of ink into droplets for printing comprising:

(a) means for determining voltage value C(H) at which droplet formation first occurs closest to the nozzle as said exciting voltage is slowly increased from a maximum value, said determining means including:

(i) means for applying electrical test patterns to said droplets, said patterns varying in phase relative to droplet timing whereby only some of the test patterns will successfully charge said droplets;

(ii) means for detecting which droplets have been successfully charged; and determining the value C(H) from a change in sequence of charge patterns;

(b) means for estimating the exciting voltage for printing according to the equation:

$$V(est) = C(H) - E$$

where E is a voltage related to the performance of the ink.

* * * * *